(12) United States Patent
Wilson et al.

(10) Patent No.: US 10,948,621 B2
(45) Date of Patent: Mar. 16, 2021

(54) MICROSTRIP ANTENNA-BASED LOGGING TOOL AND METHOD

(71) Applicant: Halliburton Energy Services, Inc., Houston, TX (US)

(72) Inventors: Glenn Andrew Wilson, Houston, TX (US); Luis San Martin, Houston, TX (US); Li Pan, Houston, TX (US); Burkay Donderici, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/765,669

(22) PCT Filed: Nov. 13, 2015

(86) PCT No.: PCT/US2015/060673
§ 371 (c)(1),
(2) Date: Apr. 3, 2018

(87) PCT Pub. No.: WO2017/082929
PCT Pub. Date: May 18, 2017

(65) Prior Publication Data
US 2018/0292558 A1 Oct. 11, 2018

(51) Int. Cl.
*G01V 3/26* (2006.01)
*H01Q 13/10* (2006.01)
(Continued)

(52) U.S. Cl.
CPC .............. *G01V 3/26* (2013.01); *H01Q 13/106* (2013.01); *H01Q 13/16* (2013.01); *H01Q 21/064* (2013.01)

(58) Field of Classification Search
CPC ....... G01V 3/08–34; H01Q 21/06–225; H01Q 13/10–18; E21B 49/00–10
See application file for complete search history.

(56) References Cited

U.S. PATENT DOCUMENTS 3,944,910 A   3/1976   Rau
4,600,887 A * 7/1986  Baldwin ............... G01V 3/30
                                                324/333
(Continued)

FOREIGN PATENT DOCUMENTS

EP   0159838   4/1985

OTHER PUBLICATIONS

International Search Report and Written Opinion for PCT/US2015/060673 dated Aug. 10, 2016.
(Continued)

*Primary Examiner* — Huy Q Phan
*Assistant Examiner* — David B Frederiksen
(74) *Attorney, Agent, or Firm* — John Wustenberg; C. Tumey Law Group PLLC

(57) ABSTRACT

A dielectric logging tool for use in a borehole that penetrates a subsurface formation, includes: at least one wall-contacting face with one or more embedded microstrip antennas including a transmit antenna; an oscillator that supplies a transmit signal; a coherent receiver that measures the one or more scattering coefficients; and a processor that derives a formation property from the one or more scattering coefficients. The tool may be conveyed along a borehole, with the scattering coefficients and derived formation property values associated with tool position and orientation to provide a permittivity log.

20 Claims, 7 Drawing Sheets

(51) Int. Cl.
*H01Q 13/16* (2006.01)
*H01Q 21/06* (2006.01)

(56) References Cited

U.S. PATENT DOCUMENTS

| | | | |
|---|---|---|---|
| 4,704,581 A | 11/1987 | Clark | |
| 5,132,623 A | 7/1992 | De et al. | |
| 5,243,290 A | 9/1993 | Safinya et al. | |
| 5,411,843 A | 5/1995 | Marien et al. | |
| 5,434,507 A | 7/1995 | Beren et al. | |
| 5,471,435 A * | 11/1995 | Marschall | G01V 1/282 342/196 |
| 6,069,590 A * | 5/2000 | Thompson, Jr. | H01Q 1/42 343/795 |
| 6,822,579 B2 | 11/2004 | Goswami et al. | |
| 7,348,781 B2 | 3/2008 | Tabanou et al. | |
| 8,612,194 B2 * | 12/2013 | Horne | G01V 3/083 702/7 |
| 8,810,455 B2 * | 8/2014 | Achour | H01Q 21/065 343/700 MS |
| 2003/0117321 A1 | 6/2003 | Furse et al. | |
| 2005/0029125 A1 * | 2/2005 | Jiang | G01N 27/403 205/775 |
| 2005/0251340 A1 | 11/2005 | Tompkins | |
| 2006/0157277 A1 * | 7/2006 | Bittar | E21B 47/00 175/26 |
| 2009/0005993 A1 * | 1/2009 | Abubakar | G01V 11/00 702/7 |
| 2009/0200016 A1 * | 8/2009 | Goodwin | E21B 47/10 166/248 |
| 2010/0071794 A1 * | 3/2010 | Homan | E21B 47/01 138/125 |
| 2010/0250141 A1 * | 9/2010 | Tompkins | G01V 3/30 702/7 |
| 2011/0221443 A1 | 9/2011 | Bittar et al. | |
| 2012/0020186 A1 * | 1/2012 | Luo | G01V 1/28 367/21 |
| 2012/0274523 A1 * | 11/2012 | Ayatollahi | H01Q 13/10 343/745 |
| 2012/0274535 A1 * | 11/2012 | Deavours | H01Q 9/0428 343/848 |
| 2012/0310060 A1 * | 12/2012 | Baker, Jr. | A61B 5/14551 600/324 |
| 2013/0049982 A1 * | 2/2013 | Hartmann | E21B 47/00 340/854.1 |
| 2013/0306740 A1 * | 11/2013 | Mathews | H01Q 9/0407 235/492 |
| 2014/0150545 A1 | 6/2014 | Schlumberger | |
| 2014/0285793 A1 * | 9/2014 | Jaaskelainen | G01L 1/242 356/32 |
| 2014/0368199 A1 * | 12/2014 | Bittar | E21B 7/04 324/337 |
| 2014/0378811 A1 * | 12/2014 | Nanaumi | A61B 5/0095 600/407 |
| 2015/0260874 A1 * | 9/2015 | Chen | G01V 3/24 324/338 |

OTHER PUBLICATIONS

"Microstrip antennas for dielectric property measurement" Deffendol et al. 1999.
"A low profile, low-RF band, small antenna for underground, in-situ sensing and wireless energy efficient transmission" Pandey et al. 2014.
"Design and Implementation of a self-calibrating, compact micro strip sensor for in-situ dielectric spectroscopy and data transmission" Pandey et al. Nov. 6, 2013.
"Optimization of a buried microstrip antenna for simultaneous communication and sensing of soil moisture" Soontompipit et al. Mar. 2006.
"An R.F. Sensor for Logging-While-Drilling Geophysical Measurements—Summary" T.M. de Swiet 1997.

* cited by examiner

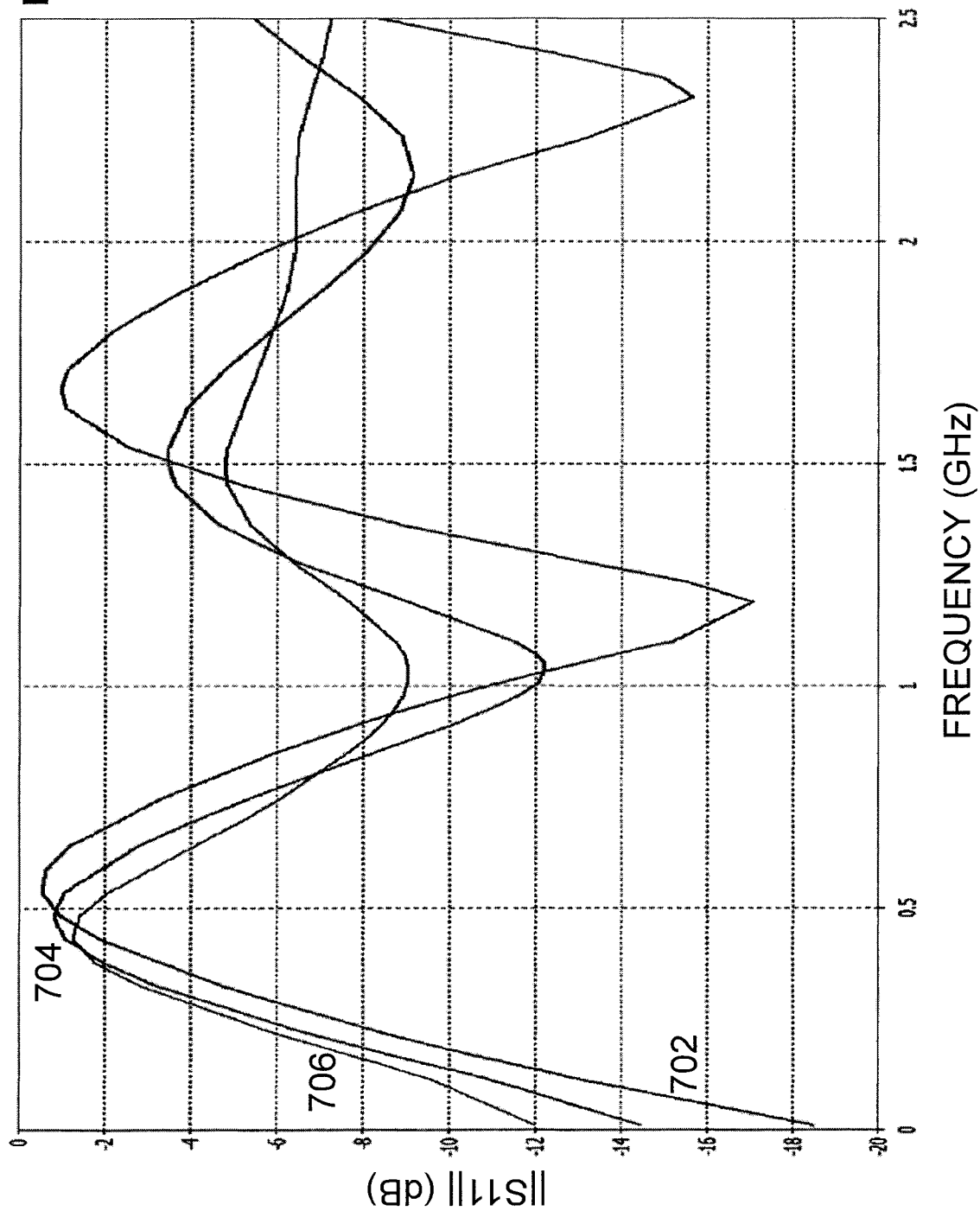

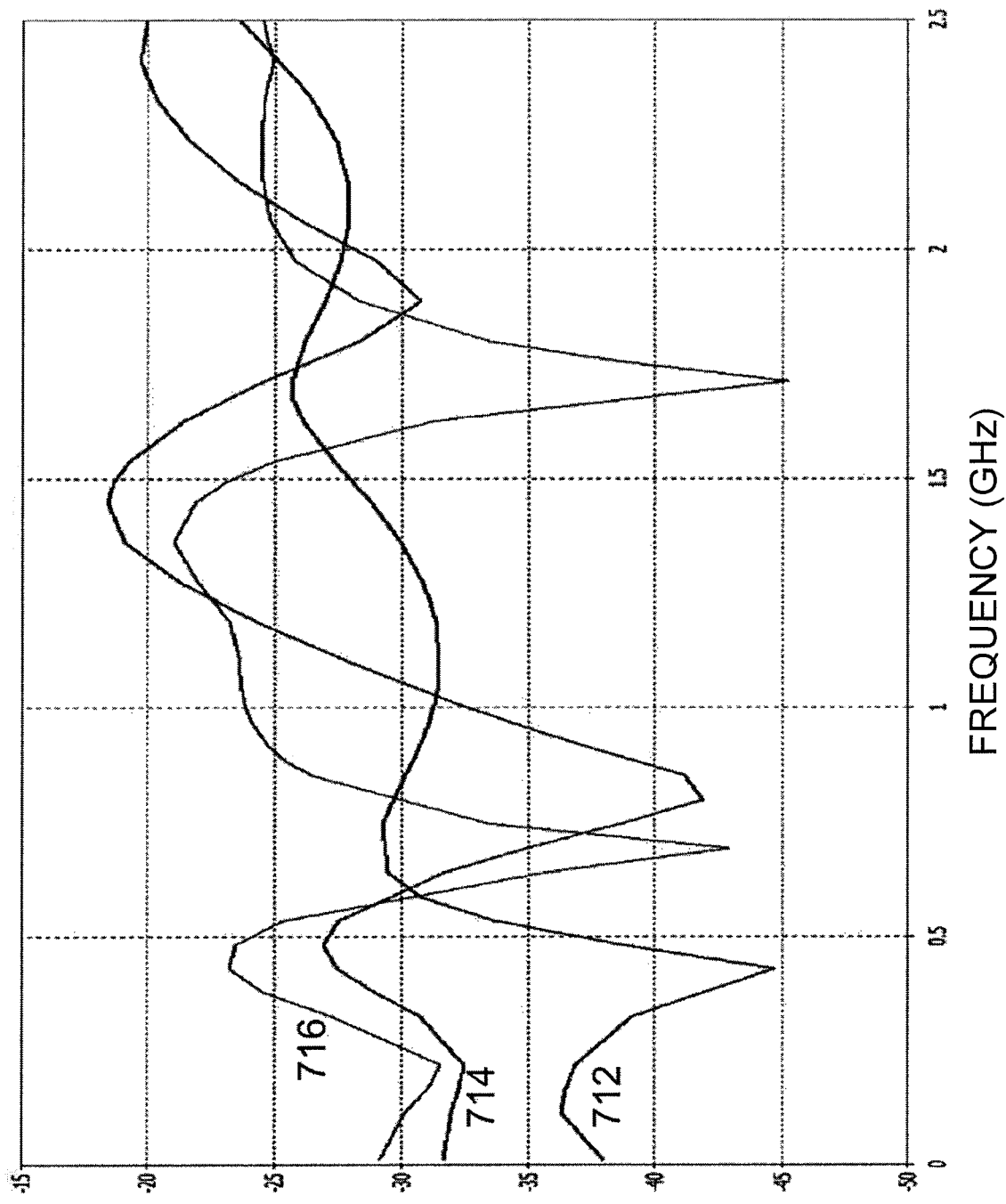

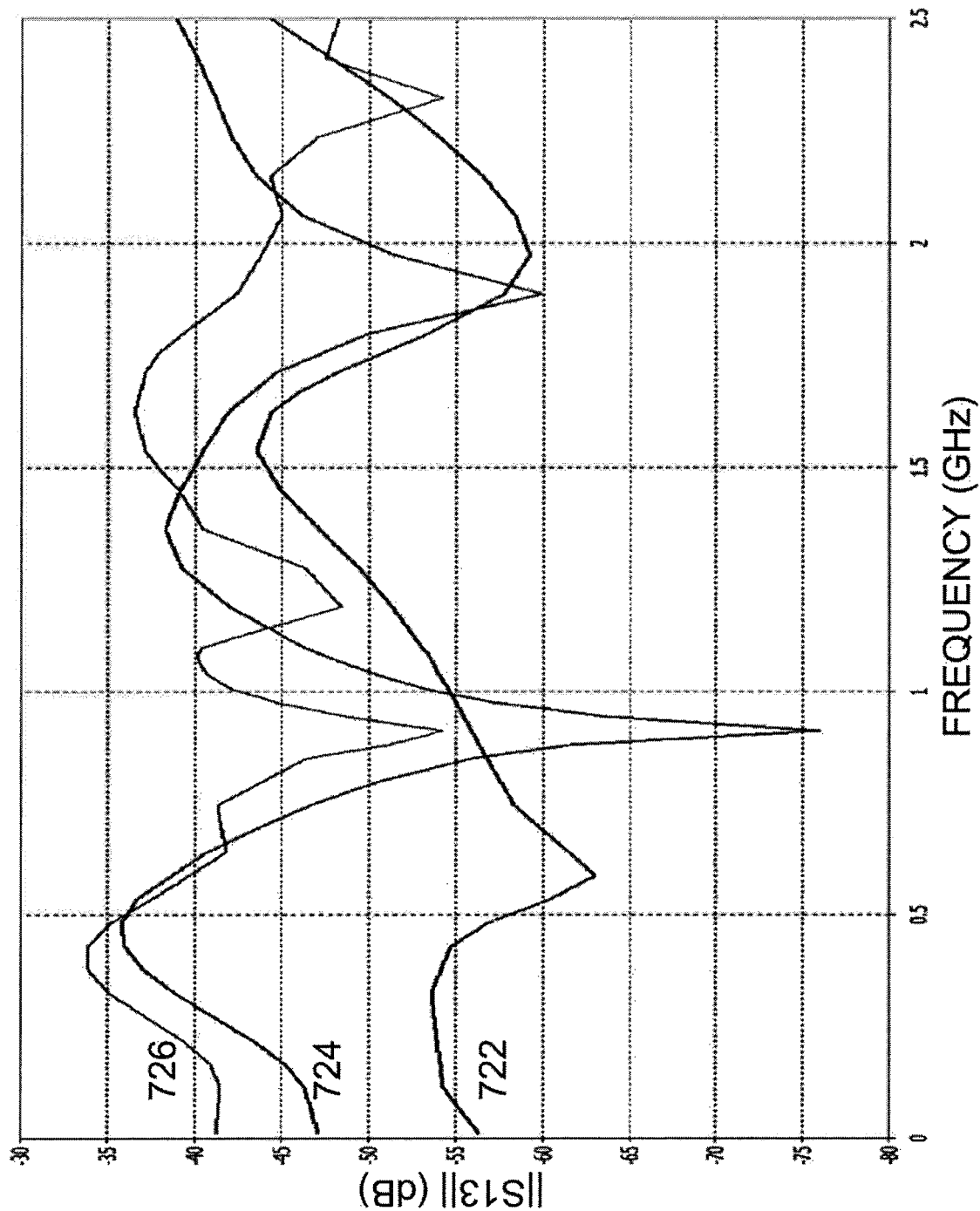

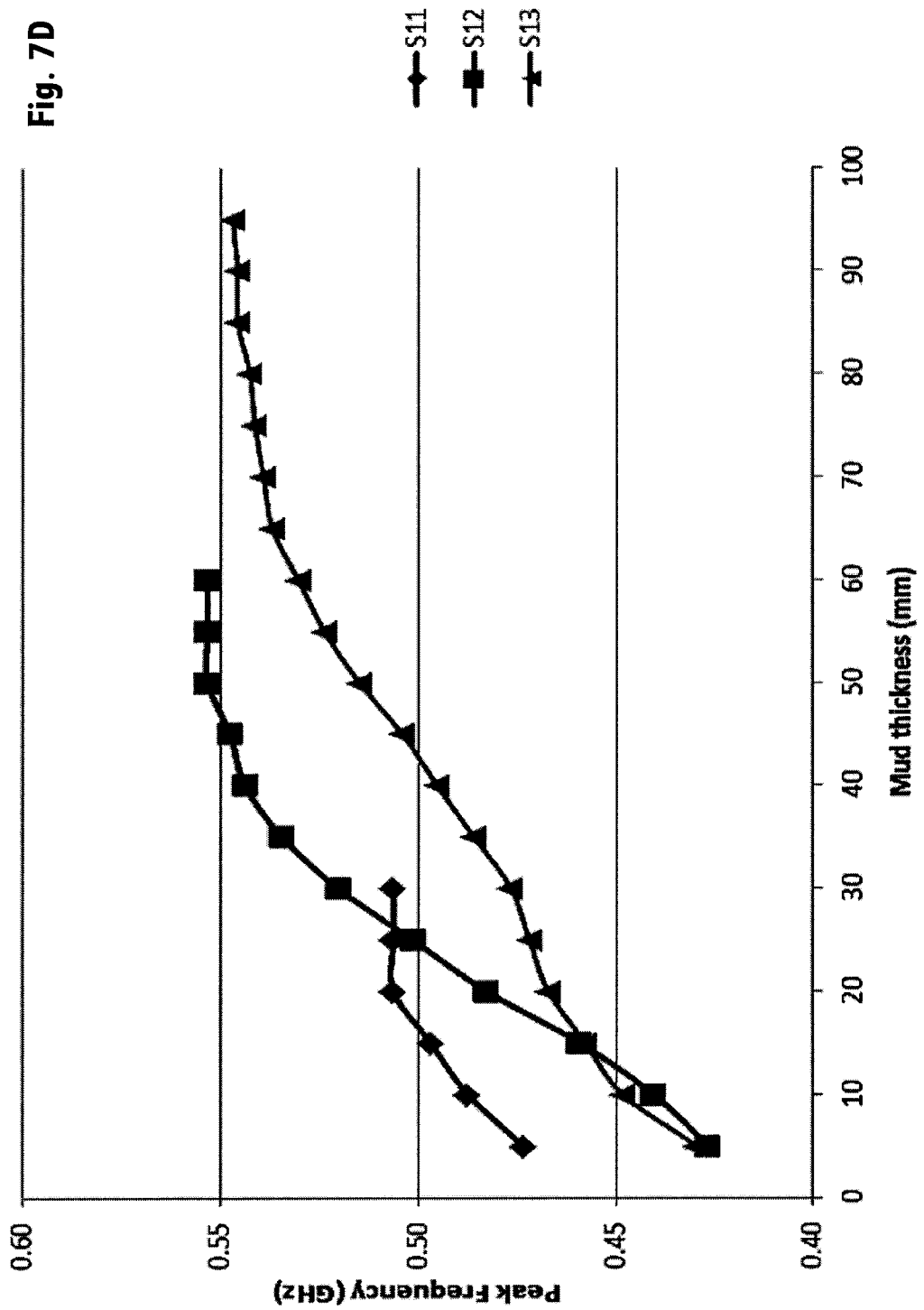

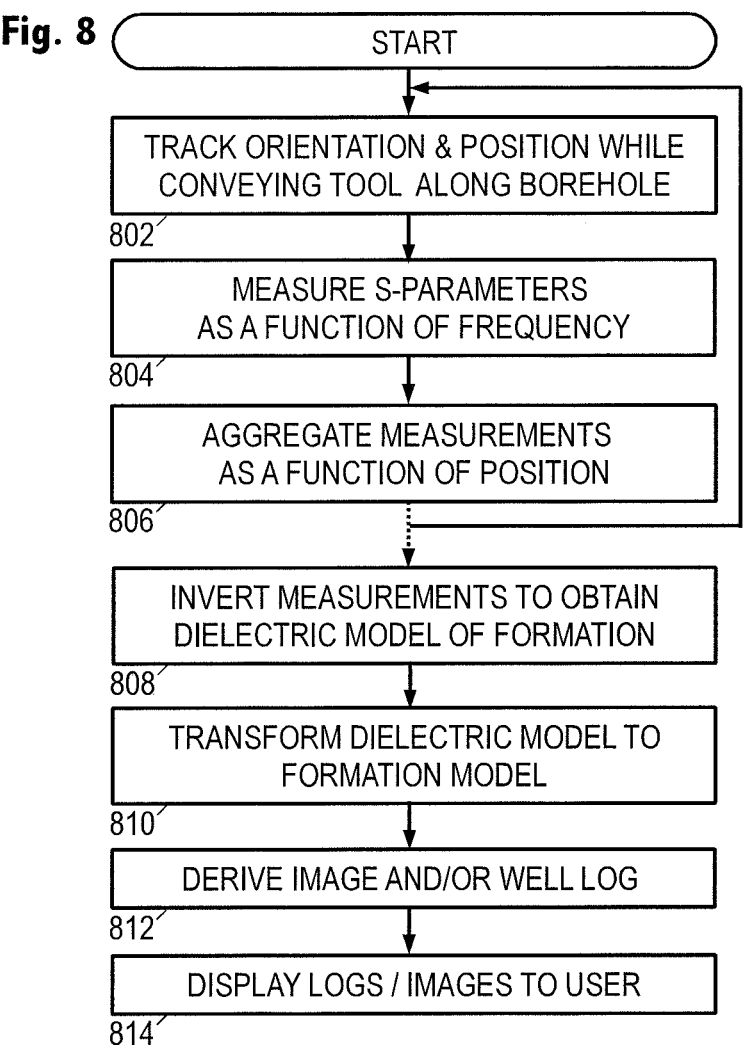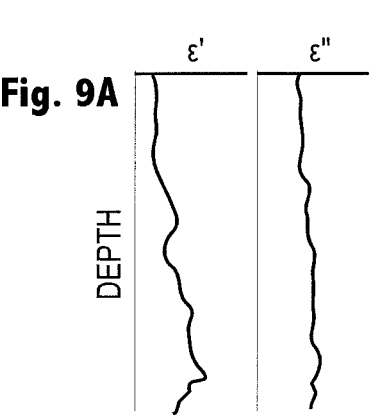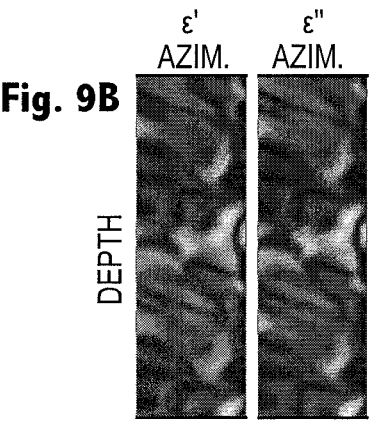

MICROSTRIP ANTENNA-BASED LOGGING TOOL AND METHOD

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging and logging-while-drilling (LWD).

In wireline logging, a probe or "sonde" is lowered into the borehole after some or the entire well has been drilled. The sonde is attached to a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated. While LWD techniques allow more contemporaneous formation measurements, drilling operations create an environment that is generally hostile to electronic instrumentation and sensor operations.

Dielectric logging tools are among the various types of available logging tools. Dielectric tools determine the dielectric constant and conductivity of downhole formations from the real and imaginary parts of the complex propagation constant of electromagnetic waves traveling through the formations. These measurements are useful for finding water-filled porosity and water saturation can be computed if formation porosity is known. If multiple water saturation measurements are available (e.g., from different types of logging tools), it becomes possible to measure characteristics of the flushed zone.

Existing tool designs have undesirable limitations on robustness and accuracy.

BRIEF DESCRIPTION OF THE DRAWINGS

Accordingly, there are disclosed in the drawings and the following description various microstrip antenna-based logging tools, systems, and methods. In the drawings:

FIGS. 7A-7C show illustrative scattering coefficients as a function of frequency.

FIG. 7D shows illustrative scattering coefficient peaks as a function of standoff.

FIG. 8 is a flow diagram of an illustrative microstrip antenna-based logging method.

FIGS. 9A-9B show illustrative permittivity logs.

Figure 1:
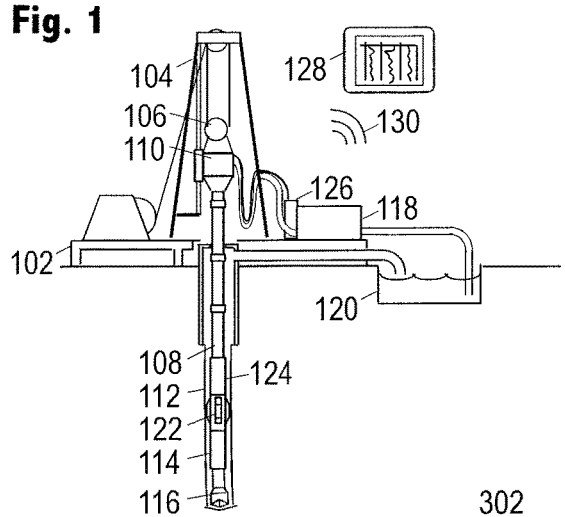
FIG. 1 shows an illustrative logging while drilling (LWD) environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOMENCLATURE

Certain terms are used throughout the following description and claims to refer to particular system components. This document does not intend to distinguish between components that differ in name but not function. The terms "including" and "comprising" are used in an open-ended fashion, and thus should be interpreted to mean "including, but not limited . . . ". The term "couple" or "couples" is intended to mean either an indirect or direct electrical, mechanical, or thermal connection. Thus, if a first device couples to a second device, that connection may be through a direct connection, or through an indirect connection via other devices and connections. Conversely, the term "connected" when unqualified should be interpreted to mean a direct connection. For an electrical connection, this term means that two elements are attached via an electrical path having essentially zero impedance.

As used herein, the term "microstrip" refers to an electrical transmission line formed by a thin-film conductor on a dielectric layer over a conductive ground plane. Microstrips are suitable for forming microwave filters, couplers, antennas, and other electrical circuit components.

DETAILED DESCRIPTION

The disclosed tools, systems, and methods are best understood in their usage contexts. Accordingly, FIG. 1 shows an illustrative logging-while-drilling (LWD) environment. A drilling platform 102 supports a derrick 104 having a traveling block 106 for raising and lowering a drill string 108. A top drive 110 supports and rotates the drill string 108 as it is lowered into a borehole 112. The rotating drill string 108 and/or a downhole motor assembly 114 rotates a drill bit 116. As bit 116 rotates, it extends the borehole 112 through various subsurface formations. The motor assembly 114 may include a rotary steerable system (RSS) that enables the drilling crew to steer the borehole along a desired path. A pump 118 circulates drilling fluid through a feed pipe to the top drive assembly, downhole through the interior of drill string 108, through orifices in drill bit 116, back to the surface via the annulus around drill string 108, and into a retention pit 120. The drilling fluid transports cuttings from the borehole 112 into the pit 120 and aids in maintaining the borehole integrity.

The drill bit 116 and motor assembly 114 form just one portion of a bottom-hole assembly (BHA) that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation or azimuth), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

A LWD microstrip antenna-based logging tool 122 may integrated into the BHA. As the bit extends the borehole through the subsurface formations, tool 122 rotates and, with one or more microstrip antennas on a wall-contacting face of a stabilizer fin, collects azimuthally-dependent scattering-coefficient measurements that a downhole controller associates with tool position and orientation measurements to map out an image of the borehole wall. The measurements can be stored in internal memory and/or communicated to the surface. A telemetry sub 124 may be included in the BHA to maintain a communications link with the surface. Mud pulse telemetry is one common telemetry technique for transferring tool measurements to a surface interface 126 and to receive commands from the surface interface, but other telemetry techniques can also be used.

A processing unit, shown in FIG. 1 in the form of a tablet computer 128, is configured by software to communicate with surface interface 126 via a wired or wireless network communications link 130, and to provide a graphical user interface (GUI) or other form of interface that enables a user to provide commands and to receive and optionally interact with a visual representation of the acquired measurements. The measurements may be in log form, e.g., a graph of the measurement value as a function of position along the borehole 112. Alternatively a parameterized formation model may be employed to invert the measurements and derive estimates of true formation properties such as the complex permittivity and its high-resolution spatial dependence. Such information can be displayed in terms of a volumetric model that the user can section, rotate, zoom, and pan to study and analyze in detail. The processing unit can take alternative forms, including a desktop computer, a laptop computer, an embedded processor, a cloud computer, a central processing center accessible via the internet, and any combination of the foregoing.

Figure 2:
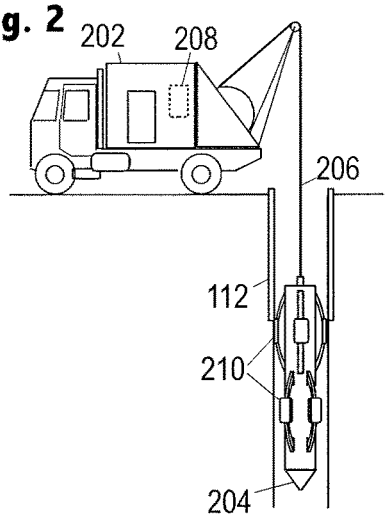
FIG. 2 shows an illustrative wireline logging environment.

At various times during the drilling process, the drill string 108 may be removed from the borehole 112, enabling wireline logging operations to be conducted as shown in FIG. 2. A logging truck 202 suspends a wireline logging tool 204 on a wireline cable 206 having conductors for transporting power to the tool and telemetry from the tool to the surface where a computer 208 acquires and stores measurement data from the logging tool 204 as a function of position along the borehole 112 and as a function of azimuth. The tool 204 may have sensing pads 210 that slide along the borehole wall as the tool is pulled uphole or otherwise conveyed along the borehole 112. Each of the pads may include one or more microstrip antennas 302 embedded on a wall-contacting face 210 as shown in FIGS. 3A-3B.

Figure 3A:
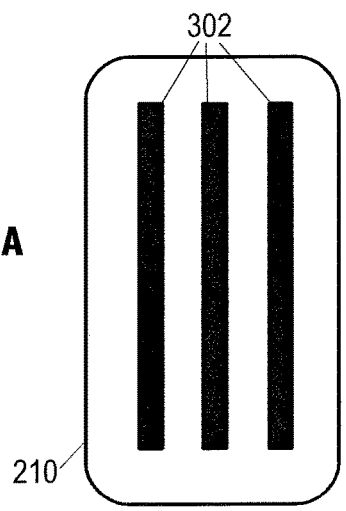
FIGS. 3A and 3B show an illustrative logging tool pad.
Figure 3B:
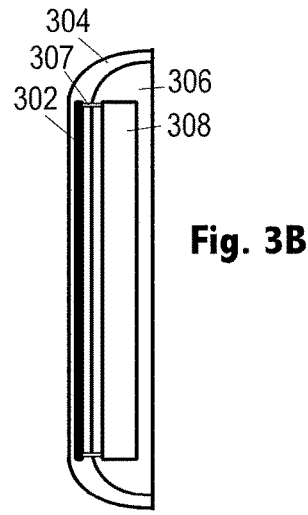

The microstrip antenna arrangement shown in FIG. 3A includes a wall-contacting face having three parallel microstrip antennas 302. (Other microstrip antenna arrangements are also contemplated and discussed further below with reference to FIG. 5.) The wall-contacting face may be a stabilizer fin, an extendible pad, or some other surface of the tool that is maintained in close proximity to the borehole wall. As shown in FIG. 3B, each of the antennas 302 is embedded in an insulating layer 304 over a conductive body 306. The conductive body 306 may be formed from metal such as steel. The insulating layer 304 protects the antennas 302 from abrasion and electrically insulates the antennas 302 from the borehole wall and the conductive body 306. One or more wires 307 couple the antennas 302 to electronics contained in cavity 308 of body 306.

Figure 4:
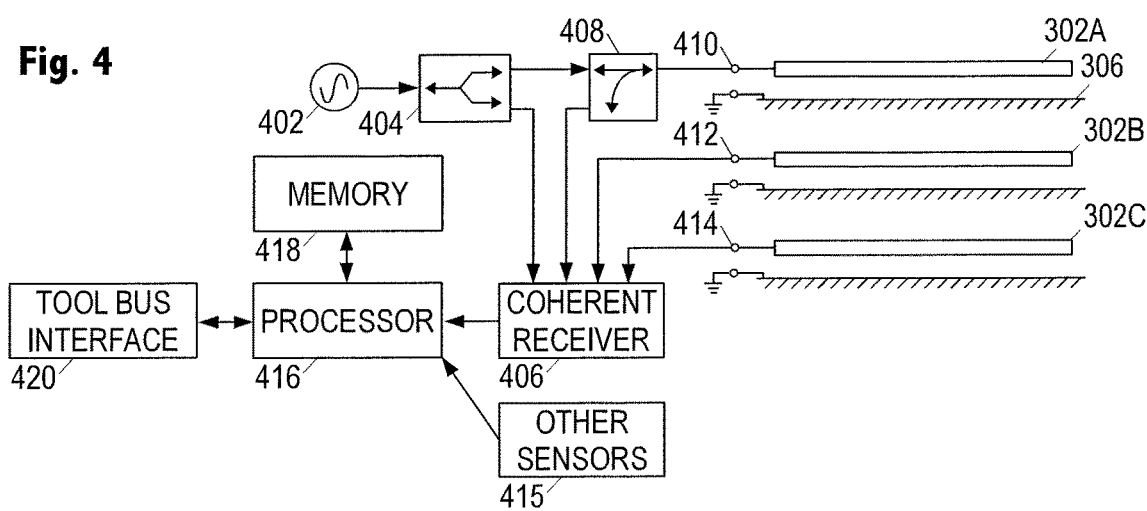
FIG. 4 is a schematic for an illustrative microstrip antenna-based logging tool.

The tool electronics include at least elements 402-414 shown in the schematic of FIG. 4. Elements 415-420 are preferably also included, but may be located in a different compartment of the tool 204 or may be located remotely, e.g., in the surface interface 126. The tool 122, 204 includes a transmit signal source 402, which in some embodiments is a voltage-controlled oscillator (VCO) capable of generating multiple frequencies in the nominal range of 10 MHz to 3 GHz, optionally in a multiplexed or swept-frequency fashion. A splitter 404 directs a predetermined portion of the transmit signal to a coherent receiver 406, which measures magnitude and phase relative to an internal oscillator, optionally in the form of in-phase and quadrature components. The rest of the transmit signal 408 is directed to a directional coupler 408.

Directional coupler 408 passes the transmit signal to node 410, which couples the signal to the microstrip transmit antenna 302A. Any return signal from node 410 is directed to the coherent receiver 406. Nodes 412 and 414 each couple one of the microstrip receive antennas 302B, 302C to the coherent receiver 406. As with the transmit signal, the coherent receiver 406 measures the magnitude and phase of the return signal from node 410 and of the receive signals from nodes 412, 414. A processor 416 operates on the measurements from receiver 406 and from any other sensors 415 to derive a log of the scattering coefficients ("S-parameters") as a function of frequency for the microstrip antenna arrangement. The other sensors 415 may include, e.g., sensors for temperature, motion, position, and orientation.

At the contemplated signal frequencies, nodes 410, 412, 414 represent transmission lines which may be implemented as coaxial cable. The electrical characteristics of the formation proximate to the microstrip antenna configuration will influence the impedance of the antennas 302A, 302B, 302C, and the mutual coupling there between, thereby affecting the scattering coefficients in a measurable, invertible way. Representing the measurements of the transmit signal, the return signal and the first and second receive signals as $S_T$, $S_1$, $S_2$, and $S_3$, respectively, the scattering coefficients may be determined (in decibels) as:

$$S_{11} = 20\log\frac{S_1}{S_T},\ S_{12} = 20\log\frac{S_2}{S_T},\ \text{and}\ S_{13} = 20\log\frac{S_3}{S_T}.$$

In some alternative embodiments, rather than determining the complex-valued scattering coefficients, the processor 416 determines the magnitude of the scattering coefficients:

$$\|S_{11}\| = 20\log\left\|\frac{S_1}{S_T}\right\|,\ \|S_{12}\| = 20\log\left\|\frac{S_2}{S_T}\right\|,\ \text{and}\ \|S_{13}\| = 20\log\left\|\frac{S_3}{S_T}\right\|.$$

The processor 416 executes software from memory 418 to determine these parameter values, associate them with the tool's position and orientation, and store them in memory 418. In at least some embodiments, the parameter values are densely sampled at logarithmically spaced frequencies from 1 MHz to 3 GHz to capture the resonance characteristics of the microstrip antenna(s) 302A, 302B, 302C, as modified by the adjacent formation. The software may further configure the processor 416 to provide some of the measurements to a tool bus interface 420 for communication to the surface interface 126 for real-time monitoring of the logging process.

Figure 5A:
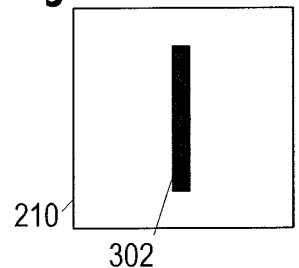
FIGS. 5A-5F show various illustrative microstrip antenna configurations.
Figure 5B:
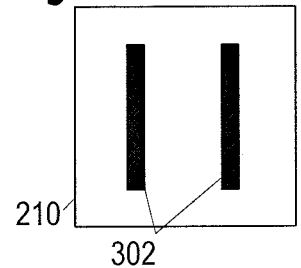
Figure 5C:
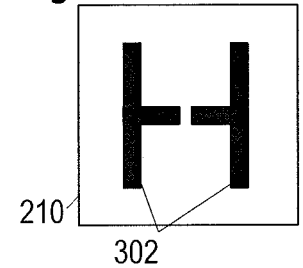
Figure 5D:
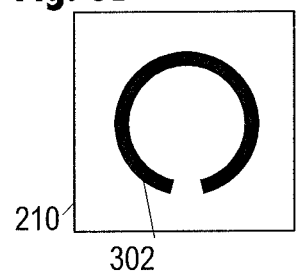
Figure 5E:
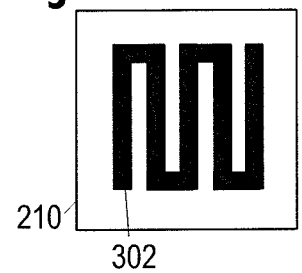
Figure 5F:
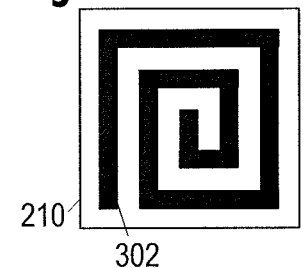

The transmission lines in FIG. 4 are shown as being coupled to the microstrip antennas 302A, 302B, 302C in a single-feed, end-fire design. Other contemplated couplings include double-feed designs, e.g., with each end of the microstrip antenna 302 being coupled to one of the input terminals. Center-fire antenna designs are also contemplated. Further contemplated microstrip antenna configurations suitable for use in the downhole microstrip antenna-based logging tools 122, 204, are shown in FIGS. 5A-5F. FIG. 5A shows a configuration of one microstrip antenna 302 on a wall-contacting face 201. FIG. 5B shows a configuration of two parallel microstrip antennas 302 on wall-contacting face 201. The microstrip antennas 302 need not be linear. FIG. 5C shows two branched microstrip antennas 302. FIG. 5D shows a circular microstrip antenna 302. FIG. 5E shows a serpentine microstrip antenna 302. FIG. 5F shows a spiral microstrip antenna 302. The various configurations offer different trade-offs between spatial resolution, depth of investigation, and performance.

Figure 6A:
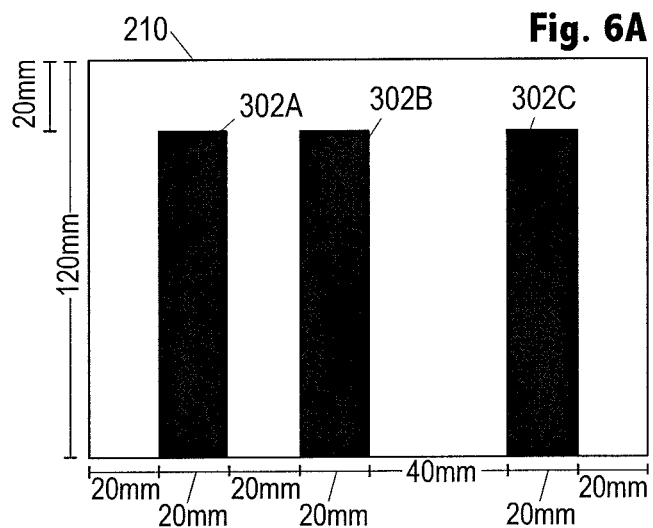
FIGS. 6A-6B show an illustrative microstrip antenna geometry.
Figure 6B:
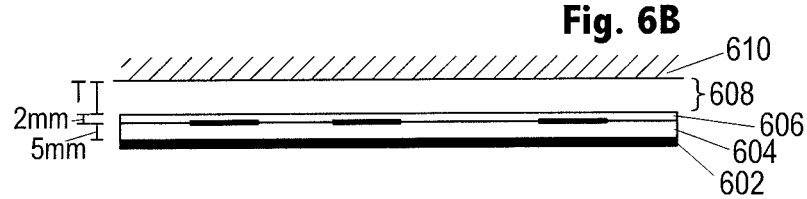

FIGS. 6A-6B show an illustrative configuration of microstrip antennas 302 on a wall-contacting face 210, with spatial dimensions that were employed for simulation. FIG. 6B shows a cross-sectional view. Substrate layer 602 is simulated as a perfect electrical conductor that measures 120 mm by 160 mm and coated with a 5 mm layer of polytetrafluoroethylene (PFTE) 604. The coating layer 604 can be any chemically-inert, non-conductive, dielectric material including PCB, alumina, or ceramic. Three microstrip antennas 302A, 302B, 302C, each 20 mm wide by 100 mm long, are provided. The leftmost microstrip antenna 302A is the transmit antenna. The first receive antenna, microstrip antenna 302B, is separated from the transmit antenna by 20 mm. The second receive antenna, microstrip antenna 302C, is 80 mm from the transmit antenna. A 2 mm protective layer 606 encapsulates and protects the microstrip antennas 302A, 302B, 302C, and underlying surfaces. Suitable materials for the protective layer 606 are thin, mechanically-resistant, non-conductive, dielectric materials such as ceramic, polymer or carbon fiber resin. A mud layer 608 of variable thickness T (ranging from zero to 100 mm) is included with resistivity of 100 ohm-m and relative permittivity of 5. The simulation further included a semi-infinite homogeneous formation 610 of resistivity 100 ohm-m and relative permittivities of $\varepsilon_F$=1, 10, and 50.

FIG. 7A shows S11 parameter curves 702, 704, 706, as a function of frequency for T=0 and $\varepsilon_F$=1, 10, and 50. FIG. 7B shows S12 parameter curves 712, 714, 716, as a function of frequency for T=0 and $\varepsilon_F$=1, 10, and 50. FIG. 7C shows S13 parameter curves 722, 724, 726, as a function of frequency for T=0 and $\varepsilon_F$=1, 10, and 50. FIG. 7D shows the peak frequency curves as a function of mud thickness T for S11, S12, and S13, with $\varepsilon_F$=50. Careful review of FIGS. 7A-7D reveals that the simulated microstrip antenna configuration provides scattering coefficients with distinctive sensitivities to formation permittivity and for standoffs up to about four inches. The use of microstrip antennas 302A, 302B, 302C, and associated circuitry is expected to provide a particularly robust microstrip antenna-based logging tool 122, 204, capable of reliably measuring the broadband dielectric properties of the formation with depths of investigation ranging from about one to four inches.

FIG. 8 is a flow diagram of an illustrative microstrip antenna-based logging method that exploits these sensitivities. In block 802, a microstrip antenna-based logging tool 122, 204 is conveyed along a borehole 112 while its position and orientation are tracked. For LWD, the microstrip antenna-based logging tool 122 is part of the bottom hole assembly and is used to perform logging while drilling. For wireline logging, the microstrip antenna-based logging tool 204 is part of a sonde that is lowered to the bottom of the region of interest and the sensing surfaces are deployed to contact the wall and perform logging as the logging tool is pulled uphole at a steady rate.

To perform logging, a multi-frequency or broadband (e.g., frequency-swept) transmit signal is applied to at least one transmit microstrip antenna 302 and the scattering coefficient for each microstrip antenna 302 is measured as a function of frequency in block 804. In block 806, the measurements are combined with other measurements for that tool position and orientation. Such measurement aggregation offers an effective way to enhance the signal-to-noise ratio of the measurements. Blocks 802-806 are repeated until the microstrip antenna-based logging tool 122, 204, has traversed the entire region of interest.

During or after the logging operation, the system employs a parameterized 1D, 2D, or 3D model in block 808 to invert the measurements and thereby derive estimates of the formation properties of interest, including resistivity, permittivity, and standoff. Such inversion is typically performed iteratively by comparing model-based predictions with the acquired measurements and refining the model parameter values until a match is achieved. In some embodiments, the inversion matches the full scattering coefficient spectrum. In other contemplated embodiments, the inversion matches the resonant frequencies (valleys) in the scattering coefficient spectra. In still other contemplated embodiments, the inversion matches the peaks in the scattering coefficient spectra. Some alternative embodiments may match both the peaks and valleys, while other embodiments may match just one of the peaks or valleys (e.g., the lowest-frequency peak). The scattering coefficient magnitudes can be used for the inversion, though some embodiments seek to match both amplitude and phase of the scattering coefficient measurements. Both deterministic and stochastic inversion techniques, with and without regularization, are contemplated. A priori information can be imposed on the models as a choice of data weights, model weights, regularization, model constraints and/or a priori models.

In block 810, the extracted parameters are used (usually in combination with measurements from other logging tools) to predict the formation properties of interest. Specifically, the real components of the dielectric properties are generally related to the formation permittivity and/or other relaxation parameters (e.g., induced polarization), while the imaginary components of the dielectric properties are generally related to the formation resistivity and/or other relaxation parameters. The formation properties of interest, which can be extracted from these components via rock physics models using in algebraic transforms or another inversion step, may include hydrocarbon saturation, porosity, water volume, rock texture (e.g., grain size, grain orientation), matrix type (e.g., fraction volume pyrite, fraction volume clay), etc. The rock physics models that relate the formation properties with the dielectric properties and vice versa may be empirical (e.g., based on Archie's Law) or may be deterministic (e.g., based on an effective medium theory), but are generally expressed as a volume-fraction summations of real and imaginary components (or amplitude and phase), that are generally frequency-dependent and anisotropic, and may be functions of resistivity, conductivity, relative permittivity, permeability, chargeability, and other induced polarization (IP) parameters.

In block 812, a visual representation of the parameter values and/or formation properties is derived from the parameterized model and/or formation property model. In block 814 the visual representation is displayed to a user and/or stored for later use in making well completion and reservoir production decisions.

The modeling and inversion methods described in this disclosure can be implemented as either a stand-alone software or integrated as part of a commercial logging software (e.g., InSite) or earth modeling software (e.g., DecisionSpace) through an application programmable interface (API). The dielectric modeling method can be based on any combination of analytical, semi-analytical, finite-difference, finite-volume, finite-element, boundary-element, and integral equation methods implemented in Cartesian, cylindrical, or polar coordinates. The dielectric modeling method can be programmed on serial and/or parallel (including GPU) processing architectures. The dielectric inversion method disclosed are encapsulated in software which may be programmed on serial or parallel processing architectures. The processing of the dielectric modeling, inversion, imaging, and related functions may be performed remotely from the well site with the remote computers (e.g., cloud computers) connected to computers at the well site via a network, thereby reducing computational resource requirements at the well site. Subject to network reliability, the dielectric modeling and inversion can still be performed in real time, even when being performed as part of a joint inversion of dielectric data with other data types (e.g., resistivity, acoustic, nuclear, and NMR).

FIG. 9A illustrates a first visual representation of formation permittivity, showing depth-based logs of the real and imaginary components of formation permittivity 6' 6". FIG. 9B shows a second illustrative visual representation of the permittivity components as a function of depth and azimuth, using color to represent the permittivity component values. The visual representation is herein referred to as a "log" whether rendered as an image (FIG. 9B) or a graph (FIG. 9A). Those regions indicating relatively high porosity and hydrocarbon saturation may represent desirable well completion zones.

In the above-described tool embodiments the number, spacing, shape, and orientation of the microstrip antennas 302, as well as the symmetry of the arrangement, can be varied to provide compensated measurements, additional depths of investigation, different sensing volumes, selected resonance frequencies, and different tolerances for borehole effects. The microstrip antennas 302 may be modified from the elongated rectangular lines to have triangular, elliptical, and bow-tie shapes.

Numerous variations and modifications will become apparent to those skilled in the art once the above disclosure is fully appreciated. For example, the reciprocity principle in many cases enables the same measurements to be obtained with the roles of the transmitting and receiving antennas exchanged. As another example, frequency-swept transmit signal may be replaced with other forms of broadband or multi-frequency signals. As yet another example, the tool may measure the transmit antenna impedance and the mutual coupling impedances rather than the scattering coefficients (or magnitudes thereof). It is intended that the following claims be interpreted to embrace all such variations and modifications where applicable.

Among the embodiments disclosed herein are the following:

Embodiment A

A permittivity logging tool for use in a borehole that penetrates a subsurface formation, the tool comprising: at least one wall-contacting face; one or more microstrip antennas disposed on the at least one wall-contacting face, the one or more microstrip antennas including a transmit antenna; an oscillator coupled to the transmit antenna to supply a transmit signal; a coherent receiver coupled to the one or more microstrip antennas to measure one or more scattering coefficients; and a processing unit coupled to the coherent receiver to derive a formation property from the one or more scattering coefficients.

Embodiment B

A logging method that comprises: moving a logging tool along a borehole, wherein the logging tool comprises one or more microstrip antennas disposed on a wall-contacting face; measuring one or more scattering coefficients of the one or more microstrip antennas; determining formation permittivity values based at least in part on the one or more scattering coefficients; and associating the formation permittivity values with tool position to provide a permittivity log.

Each of the Embodiments A and B may further include one or more of the following features in any combination. (1) the formation property includes complex permittivity. (2) the one or more microstrip antennas further include at least two receive antennas. (3) the processing unit is downhole and stores the formation property in a downhole memory. (4) the processing unit is coupled to a surface interface to receive the one or more scattering coefficients via a wired or wireless link. (5) the at least one wall-contacting face is part of a sensing pad biased against a borehole wall by a wireline tool. (6) the wireline tool includes multiple sensing pads, each having a wall-contacting face with one or more microstrip antennas. (7) the at least one wall-contacting face is part of a stabilizer fin. (8) the coherent receiver measures the scattering coefficients at multiple frequencies. (9) the transmit signal is a frequency-swept signal that ranges from below 10 MHz to over 1 GHz. (10) the coherent receiver is further coupled to measure the transmit signal. (11) the permittivity log is stored on a nontransient information storage medium. (12) a visual representation of the permittivity log is displayed for use in identifying a completion zone. (13) measuring the scattering coefficients includes measuring S11, S12, and S13. (14) measuring the scattering coefficients includes measuring a phase of the one or more scattering coefficients. (15) determining formation permittivity includes inverting for formation resistivity, size of a standoff gap, and/or permittivity of fluid in the standoff gap. (16) measuring the scattering coefficients includes detecting a frequency dependence of the one or more scattering coefficients.

What is claimed is:

1. A logging tool for use in a borehole that penetrates a subsurface formation, the tool comprising:
   at least one wall-contacting face that includes:
      a substrate layer disposed on the at least one wall-contact face;

a coating layer disposed on the substrate layer, wherein the coating layer is a polytetrafluoroethylene, a chemically-inert layer, a non-conductive layer, a ceramic, or an alumina;

one or more microstrip antennas disposed on the coating layer, the one or more microstrip antennas including a transmit antenna; and a protective layer disposed over the one or more microstrip antennas and the coating layer, wherein the protective layer is a second ceramic, a polymer, or a carbon fiber resin;

an oscillator coupled to the transmit antenna to supply a transmit signal;

a coherent receiver coupled to the one or more microstrip antennas to measure one or more scattering coefficients;

a directional coupler that is connected to the one or more microstrip antennas and the coherent receiver; and a processing unit coupled to the coherent receiver to derive a formation property from the one or more scattering coefficients.

2. The tool of claim 1, wherein the formation property includes complex permittivity.

3. The tool of claim 1, wherein the one or more microstrip antennas further include at least two receive antennas.

4. The tool of claim 1, wherein the processing unit is downhole and stores the formation property in a downhole memory.

5. The tool of claim 1, wherein the processing unit is coupled to a surface interface to receive the one or more scattering coefficients via a wired or wireless link.

6. The tool of claim 1, wherein the at least one wall-contacting face is part of a sensing pad biased against a borehole wall by a wireline tool.

7. The tool of claim 6, wherein the wireline tool includes multiple sensing pads, each having a wall-contacting face with one or more microstrip antennas.

8. The tool of claim 1, wherein the at least one wall-contacting face is part of a stabilizer fin.

9. The tool of claim 1, wherein the coherent receiver measures the scattering coefficients at multiple frequencies.

10. The tool of claim 9, wherein the transmit signal is a frequency-swept signal that ranges from below 10 MHz to over 1 GHz.

11. The tool of claim 1, wherein the coherent receiver is further coupled to measure the transmit signal.

12. A logging method that comprises:

moving a logging tool along a borehole, wherein the logging tool includes:

at least one wall-contacting face that includes:

a substrate layer disposed on the at least one wall-contact face;

a coating layer disposed on the substrate layer, wherein the coating layer is a polytetrafluoroethylene, a chemically-inert layer, a non-conductive layer, a ceramic, or an alumina;

one or more microstrip antennas disposed on the coating layer, the one or more microstrip antennas including a transmit antenna; and a protective layer disposed over the one or more microstrip antennas and the coating layer, wherein the protective layer is a second ceramic, a polymer, or a carbon fiber measuring one or more scattering coefficients of the one or more microstrip antennas;

determining formation values based at least in part on the one or more scattering coefficients; and associating the formation values with tool position to provide a log.

13. The method of claim 12, wherein the log is a permittivity log.

14. The method of claim 12, further comprising:

storing the log on anon-transient information storage medium; and displaying a visual representation of the log for use in identifying a completion zone.

15. The method of claim 12, wherein the one or more microstrip antennas include at least one transmit antenna and at least two receive antennas, and wherein said measuring includes measuring S11, S12, and S13.

16. The method of claim 12, wherein said measuring includes measuring a phase of the one or more scattering coefficients.

17. The method of claim 12, wherein said determining includes inverting for formation resistivity, size of a standoff gap, and permittivity of fluid in the standoff gap.

18. The method of claim 12, wherein the logging tool is a wireline logging tool with a sensing pad having the wall-contacting face.

19. The method of claim 12, wherein the logging tool is a logging while drilling tool with a stabilizer fin having the wall-contacting face.

20. The method of claim 12, wherein said measuring includes detecting a frequency dependence of the one or more scattering coefficient.

* * * * *